(12) United States Patent
Weinberg et al.

(10) Patent No.: US 11,565,835 B1
(45) Date of Patent: Jan. 31, 2023

(54) CONTROLLED SEPARATION JOINT

(71) Applicant: Stratolaunch, LLC, Mojave, CA (US)

(72) Inventors: Erich K. Weinberg, Kent, WA (US); Michael Zack Eckblad, Auburn, WA (US)

(73) Assignee: Stratolaunch, LLC, Mojave, CA (US)

( * ) Notice: Subject to any disclaimer, the term of this patent is extended or adjusted under 35 U.S.C. 154(b) by 1001 days.

(21) Appl. No.: 16/268,431

(22) Filed: Feb. 5, 2019

(51) Int. Cl.
*B64G 1/64* (2006.01)
*F42B 15/38* (2006.01)
*F16B 2/06* (2006.01)

(52) U.S. Cl.
CPC .............. *B64G 1/645* (2013.01); *F42B 15/38* (2013.01); *F16B 2/065* (2013.01); *Y10T 403/11* (2015.01)

(58) Field of Classification Search
CPC .......... B64G 1/645; F16B 2/065; F16B 4/002; F16B 5/02; F16B 5/0275; F16B 7/0433; F16B 31/005; F16B 2200/506; F42B 15/38; Y10T 403/11; Y10T 403/13; Y10T 403/645; Y10T 403/7067; Y10T 403/7069
USPC ...... 411/19, 20; 403/2, 5, 337, 374.3, 374.4; 89/1.14
See application file for complete search history.

(56) References Cited

U.S. PATENT DOCUMENTS

| | | | | |
|---|---|---|---|---|
| 3,698,281 A * | 10/1972 | Brandt | ................... | F42B 15/38 89/1.14 |
| 4,685,376 A * | 8/1987 | Noel | ....................... | F42B 15/38 89/1.14 |
| 5,390,606 A * | 2/1995 | Harris | ..................... | B64G 1/645 89/1.14 |
| 5,402,728 A * | 4/1995 | Garner | .................... | B64G 1/645 411/19 |
| 6,125,762 A * | 10/2000 | Fritz | ........................ | F42B 15/38 89/1.14 |
| 6,298,786 B1 * | 10/2001 | Grosskrueger | ........ | F42B 15/38 102/377 |
| 7,513,184 B2 * | 4/2009 | Kister | ..................... | B64G 1/645 89/1.14 |
| 8,607,705 B2 * | 12/2013 | Golden | ................... | F42B 15/38 89/1.14 |
| 8,695,473 B2 * | 4/2014 | Kametz | .................... | F42B 15/38 89/1.14 |
| 8,776,661 B2 * | 7/2014 | Cousin | .................... | B64G 1/645 89/1.14 |
| 9,027,481 B2 * | 5/2015 | Kister | .................... | B64G 1/645 89/1.14 |
| 9,062,946 B2 * | 6/2015 | Cousin | .................... | F42B 15/38 |

(Continued)

FOREIGN PATENT DOCUMENTS

| | | | | |
|---|---|---|---|---|
| DE | 3833698 A1 * | 4/1990 | ............. | B64G 1/645 |
| FR | 3028609 B1 * | 5/2017 | ............. | B64G 1/645 |

*Primary Examiner* — Josh Skroupa
(74) *Attorney, Agent, or Firm* — Davis Wright Tremaine LLP (57) ABSTRACT

A joint that is separable by detonating a detonating cord within an expanding tube. The joint is held together with a set of bolts. Each bolt is retained on one side of the joint with a lever. The expanding tube is retained under an arm of each lever. When the detonating cord is activated, the tube expands and exerts a force against an arm of each lever, thereby breaking the set of bolts, and allowing the joint to separate. In one example, the separable joint is used to retain a payload fairing on a launch vehicle so that the fairing can be jettisoned during flight.

18 Claims, 10 Drawing Sheets

(56) References Cited

U.S. PATENT DOCUMENTS

| | | | | |
|---|---|---|---|---|
| 9,086,260 B2* | 7/2015 | Kister | .................... | B64G 1/645 |
| 10,479,473 B2* | 11/2019 | Kossar | .................. | B64C 39/024 |
| 10,934,029 B2* | 3/2021 | Bower | ................... | B64G 1/645 |
| 2003/0196544 A1* | 10/2003 | Comtesse | ............... | F42B 15/38 |
| | | | | 89/1.14 |
| 2019/0168899 A1* | 6/2019 | Fairlie | .................... | B64G 1/645 |

\* cited by examiner

CONTROLLED SEPARATION JOINT

BACKGROUND

Separable joints are an important part of many mechanical systems such as spacecraft and aircraft. For example, spacecraft often include components that are separated and jettisoned during phases of flight. When launching a satellite on top of a launch vehicle, for example, the satellite is covered by a fairing that protects the satellite during launch and provides an aerodynamic shape as the launch vehicle travels through the atmosphere. When the launch vehicle reaches an altitude where atmospheric drag is no longer significant, one or more separable joints are activated and the fairing is jettisoned from the launch vehicle before the launch vehicle proceeds to a higher orbit. This reduces the mass of the remaining payload, and therefore the amount of fuel required to reach the desired altitude. Therefore, the creation of dependable, reliable, and lightweight separable joints is an important problem.

BRIEF DESCRIPTION OF THE DRAWINGS

Various techniques will be described with reference to the drawings, in which.

DETAILED DESCRIPTION

Techniques and systems described below relate to a separable joint that allows for the separation of a component using a command trigger. In one example, the joint is used as part of a launch vehicle that launches a satellite. The satellite is attached to the top of the launch vehicle, and is covered with an aerodynamic fairing. The fairing includes one or more separable joints that attaches portions of the fairing to each other and attaches the fairing to the launch vehicle. After the launch vehicle passes through the majority of the atmosphere (in some examples, at about 200,000 feet), the separable joints on the fairing are triggered, allowing the fairing to be jettisoned. This allows for considerable mass savings as the launch vehicle continues to accelerate. In another embodiment, the separable joint is used to retain an aircraft canopy or ejection seat. In yet another embodiment, the separable joint is used to retain a drill tool or escape hatch on an undersea vehicle.

In one example, the separable joint is constructed using two pieces of U-shaped channel. The two pieces of U-channel are joined lengthwise with a plurality of bolts to form a joint with an H-shaped cross-section. The head of each bolt is retained inside of one of the channels, and holds the joint together by screwing into an L-shaped lever in the other channel. In one example, separation of the joint is facilitated by using an expanding tube assembly. In some examples, the expanding tube assemblies constructed using a stainless steel tube with mild detonating cord running the length of the tube. Detonation of the mild detonating cord may be initiated at either or both ends of the expanding tube assembly. Detonation of the mild detonating cord causes the tube to expand, exerting a force on adjacent structures.

During construction of the joint, the expanding tube assembly is routed through the length of the U-channel and underneath the arm of each L-shaped lever. In some examples, the portion of the expanding tube beneath each L-shaped lever is flattened. The expanding tube assembly includes a piece of mild detonating cord that runs the length of the tube. When the detonating cord is activated (detonates) the tube is expanded and takes on a more oval or circular shape. The expansion of the expanding tube exerts a force on each arm of each L-shaped lever, and breaks the bolts that hold together the pieces of U-channel. Once the bolts are broken, the pieces of U-channel are free to separate, thereby allowing the joint to separate.

In some examples, one or more keyways are added between the pieces of U-channel. The keyways carry shear loading of the joint, thereby allowing the bolts to retain the joint in tension. In some examples, a keyway is located lengthwise down the center of the joint. In other examples, one or more keyways are located across the width of the joint with the intent to limit shear farce at the bolt 306.

Various embodiments of the separable joint described herein have many advantages over existing designs. In some embodiments, by providing a keyway between the portions of the joint, the joint is very strong in shear, and yet because shear loads are carried by the keyway, only tension loads need be carried by the bolts. This allows the bolts to be relatively small and lightweight in many applications. Some embodiments use a lever in conjunction with the energetic element to reduce the amount of the energetic element needed to break the bolts, thereby reducing mass and improving the reliability with which the joint is separated. In various embodiments, a U-channel contains the energetic element, levers, and broken bolt heads, thereby limiting the spread of debris outside the separable joint. This helps to avoid any contamination of the payload as the fairing is separated from the launch vehicle.

Figure 1:
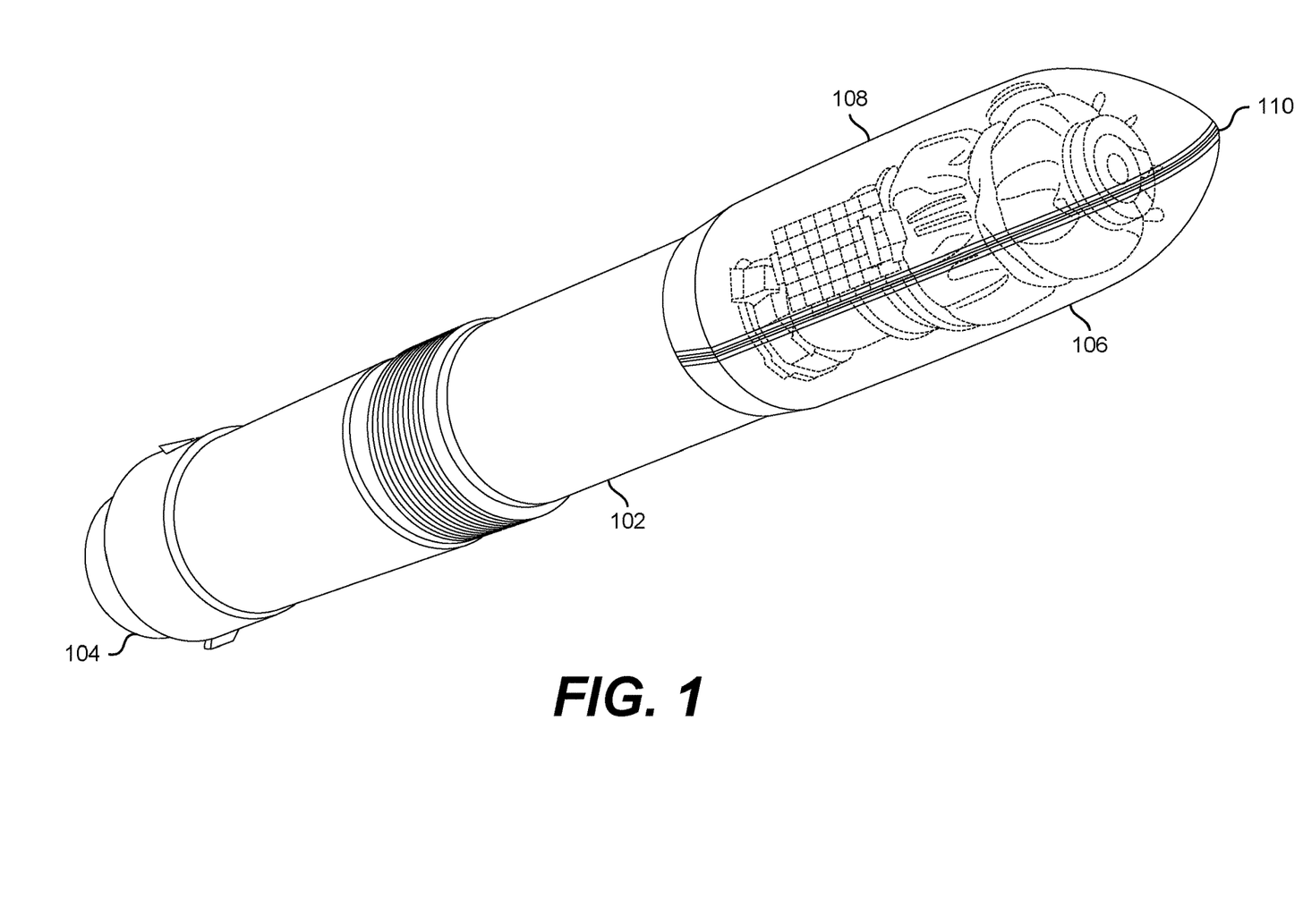
FIG. 1 illustrates an example of a launch vehicle with a payload fairing, in accordance with an embodiment.

FIG. 1 illustrates an example of a launch vehicle 102 with a payload fairing, in accordance with an embodiment. The launch vehicle 102 is propelled by a rocket engine 104 and delivers a payload into space. The payload, in various embodiments, can be a satellite, instrument, spacecraft, or scientific probe. The payload is protected by a payload fairing during the initial launch and flight of the launch vehicle 102. The payload fairing is constructed from a first fairing portion 106 and a second fairing portion 108. The first fairing portion 106 and the second fairing portion 108 are connected with a separable joint 110. In some embodiments, the payload fairing is connected to the launch vehicle 102 with an additional separable joint.

In various embodiments, the separable joint 110 is constructed using two U-channels that are connected with a set of bolts. In some examples, the bolts are arranged in an alternating pattern along the length of the channels. One end of each bolt is retained with an L-shaped lever, and an expanding tube assembly is positioned underneath an arm of each lever.

The expanding tube assembly is a tube containing an energetic material that, when activated, causes the tube to expand exerting a force on the arm of each lever. In various examples, the energetic material can be an explosive, flammable substance, or expanding gas. In one example, the energetic material is mild detonating cord. One example of a suitable expanding tube assembly is an expanding tube assembly ("XTA") or expanding shielded mild detonating cord ("XSMIDC") assembly produced by Pacific Scientific Energetic Materials Company (psemc.com). In various examples, the expanding tube assembly can be a variety of cross-sectional shapes including oval, round, square, or rectangular.

When the expanding tube assembly is activated (for example, by detonating the mild detonating cord), the expanding tube assembly expands, exerting a force on each lever of the separable joint 110. The force is magnified by the lever and pulls and bends on each bolt, breaking the bolt. In some embodiments, the bolt is broken in tension. In other embodiments, the bolt is broken in shear. In yet another embodiment, the bolt is broken in a combination of tension and shear forces. By breaking the bolts, the separable joint 110 is free to separate, allowing the first fairing portion 106 to be separated from the second fairing portion 108, and in some embodiments allowing the fairing to be separated from the launch vehicle 102.

By using a lever to magnify the force exerted by the expanding tube, less force and less energetic material is required to break a given size of bolts, thereby allowing for either a stronger joint utilizing larger bolts, or a lighter joint utilizing less energetic material. In some examples, the separable joint is reinforced by providing one or more keyways that carry shear load imposed on the joint.

Figure 2A:
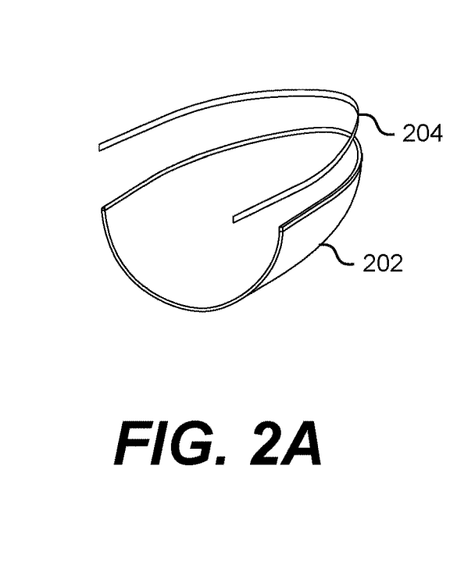
FIG. 2A illustrates an example of a first portion of a payload fairing with a separable joint, in accordance with an embodiment.

FIG. 2A illustrates an example of a first portion 202 of a payload fairing with a separable joint 204, in accordance with an embodiment. The separable joint 204 includes a first U-shaped channel attached to the first portion 202 of the payload fairing. The first U-shaped channel is attached to a second U-shaped channel with a set of bolts that are broken to separate the joint.

Figure 2B:
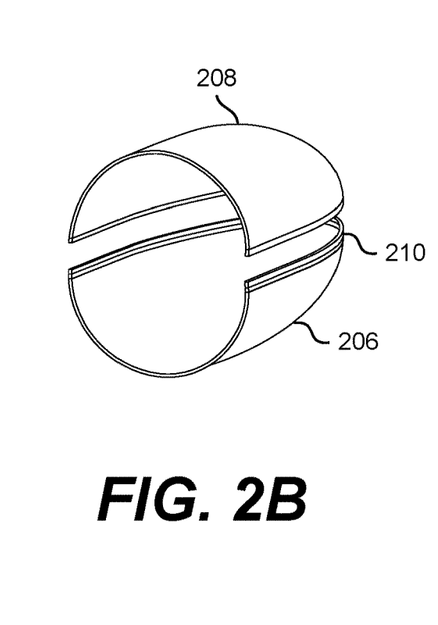
FIG. 2B illustrates an example of a payload fairing with a separable joint, in accordance with an embodiment.

FIG. 2B illustrates an example of a payload fairing with a separable joint, in accordance with an embodiment. A first section of the payload fairing 206 is connected to a second section of the payload fairing 208 using a separable joint 210. The separable joint 210 is constructed using a pair of U-shaped channels; a first U-shaped channel, and a second U-shaped channel. The first section of the payload fairing 206 is connected to the first U-shaped channel. The second section of the payload fairing 208 is connected to the second U-shaped channel. The first U-shaped channel is connected to the second U-shaped channel with a set of bolts that hold the joint together in tension. In the present document, the joint is described as assembled with bolts, but it is understood that various bolt-like fasteners may be used such as hardened rivets, all-thread, machine screws, or pins. One end of each bolt is retained in the first U-shaped channel, and the other end of each bolt is retained in the second U-shaped channel. One end is retained with a nut or bolt head, and the other end is retained by a threaded lever. In various examples, the lever is made from a strong rigid material such as steel, stainless steel, or titanium. An expanding tube runs the length of the separable joint 210, and runs underneath the levers. When the expanding tube is activated, a force is exerted upwards on an arm of each lever, breaking the bolts, and allowing the joint to separate.

In some examples, keyways are provided between the first U-shaped channel and the second U-shaped channel to carry shear loads so that the bolts need only supply the required strength in tension. This allows smaller bolts to be used in some applications, as the bolts are caring lighter loads. In turn this may allow the bolts to be more easily broken by the expanding tube.

In some implementations, the bolts are positioned in an alternating pattern along the length of the U-shaped channels. Each lever has an arm facing towards the center of the channel and over the expanding tube which runs the length of the U-shaped channel.

Figure 2C:
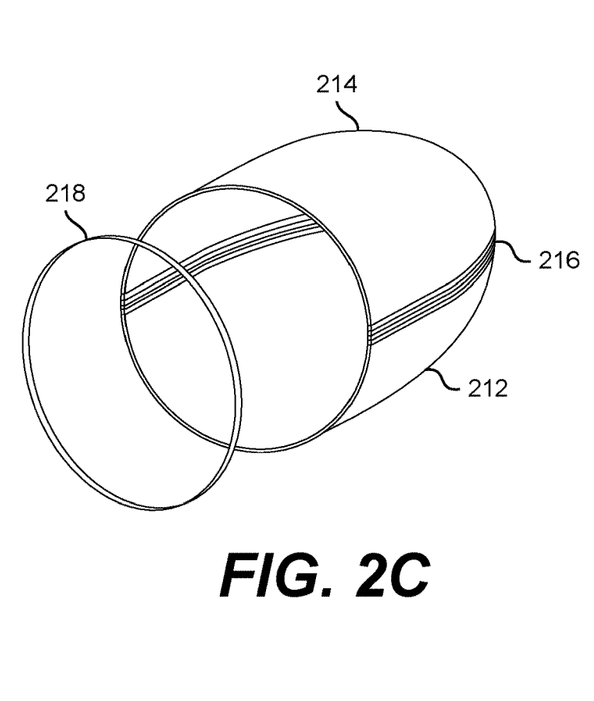
FIG. 2C illustrates an example of a payload fairing with two separable joints, in accordance with an embodiment.

FIG. 2C illustrates an example of a payload fairing with two separable joints, in accordance with an embodiment. A first section of the payload fairing 212 is connected to a second section of the payload fairing 214 using a first separable joint 216. The first separable joint 216 is constructed using a pair of U-shaped channels, a first U-shaped channel, and a second U-shaped channel, as described above.

The payload fairing is attached to a launch vehicle with a second separable joint 218. The second separable joint 218 can be constructed using a third T-shaped channel and a fourth U-shaped channel joined with bolts and secured by levers as described above. In some examples, a single expanding tube assembly is routed through both the first separable joint 216 and the second separable joint 218. In other examples, separate expanding tube assemblies are used for the first separable joint 216 and the second separable joint 218. In one implementation, mild detonating cord from the first separable joint 216 and the second separable joint 218 are interconnected causing both separable joints to be released at approximately the same time. In another implementation, mild detonating cord in the first separable joint 216 is detonated separately from the second separable joint 218 allowing the separation of each separable joint to be timed independently.

Figure 3A:
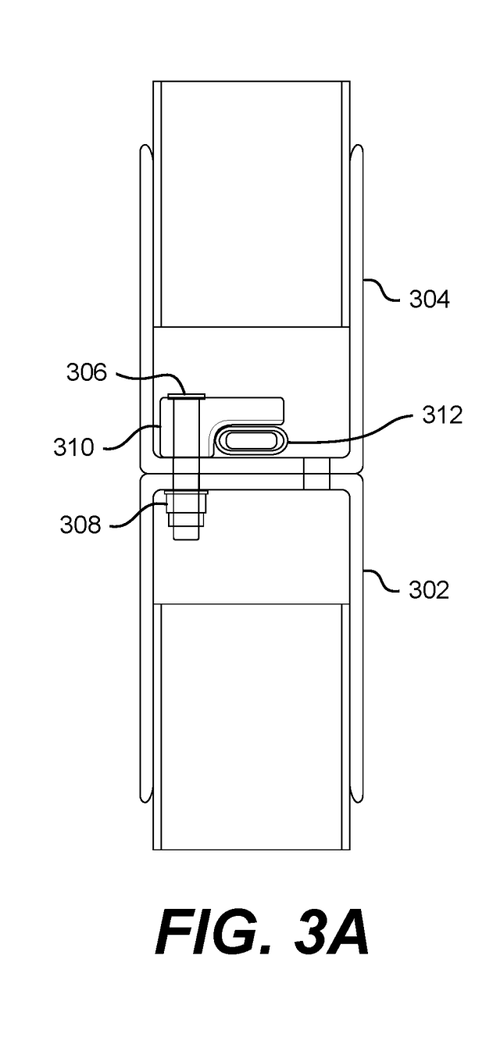
FIG. 3A illustrates an example of a separable joint in accordance with an embodiment.

FIG. 3A illustrate an example of a separable joint in accordance with an embodiment. The separable joint is created by attaching a first U-channel 302 to a second U-channel 304 with a set of bolt-lever assemblies that can be broken upon command. A bolt-lever assembly includes a bolt 306, a nut 308, and a lever 310. In an embodiment, the bolt 306 passes through a hole in the lever 310 and is retained by the second U-channel 304. The nut 308 is threaded onto the end of the bolt retaining the other end of the bolt in the first U-channel 302. In another example, a first end of the bolt 306 is retained in the first U-channel 302 by a head on the bolt 306, and a second end of the bolt 306 is retained in the second U-channel 304 by threads in the lever 310.

An expanding tube assembly 312 is positioned under an arm of the lever 310. In one embodiment, the expanding tube contains mild detonating cord that, when detonated, causes the expanding tube assembly 312 to expand and exert a force on the arm of the lever 310. The lever 310 is pried upwards breaking the bolt 306 and releasing the first U-channel 302 from the second U-channel 304.

In various embodiments, a plurality of bolt-lever assemblies are used to attach the first U-channel 302 to the second U-channel 304. In one example, an alternating pattern of bolt-lever assemblies is distributed along the length of the joint and on each side of the expanding tube assembly. The arm of each lever extends towards the center of the joint holding the expanding tube assembly in place. In some examples, the expanding tube has a circular cross-sectioned along part of the joint, and is flattened under each arm of a lever. By flattening the area of the expanding tube under each lever arm, the force exerted by the expanding tube assembly is increased.

Figure 3B:
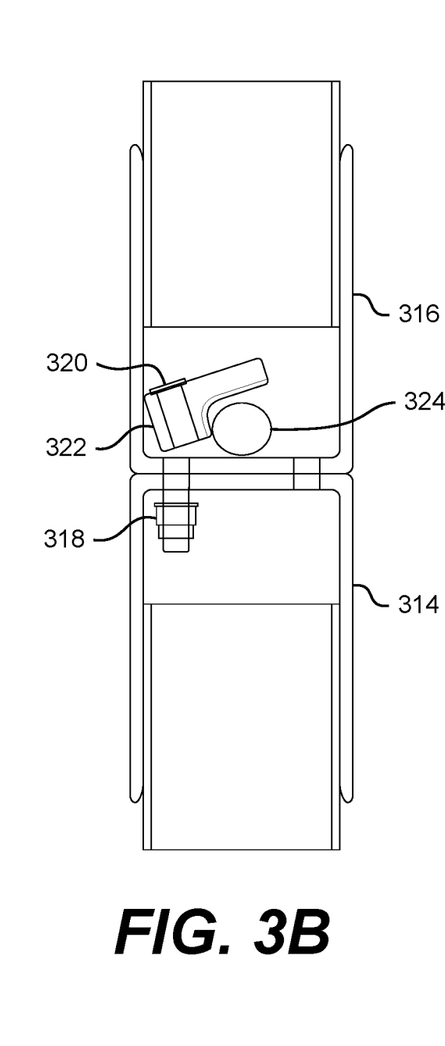
FIG. 3B illustrates an example of an activated separable joint in accordance with an embodiment.

FIG. 3B illustrates an example of an activated separable joint in accordance with an embodiment. The separable joint is created by attaching a first U-channel 314 to a second U-channel 316 with a set of bolt-lever assemblies that can be broken upon command. A bolt-lever assembly includes a bolt 320, a nut 318, and a lever 322. In an embodiment, the bolt 320 passes through a hole in the lever 322 and is retained by the second U-channel 316. In one example, the nut 318 is threaded onto the end of the bolt, retaining the other end of the bolt in the first U-channel 302. In another example, a first end of the bolt 320 is retained in the first U-channel 314 by a head on the bolt 320, and a second end of the bolt 320 is retained in the second U-channel 316 by threads in the lever 322.

In the example joint shown in FIG. 313 the state of the joint is shown after an expanding tube assembly 324 has been activated. In various examples, activation may occur by detonating an energetic material within the expanding tube assembly, hydraulically expanding the expanding tube, or injecting the tube with an expanding gas. The expanded tube assembly 324 is positioned under an arm of the lever 322. As shown in FIG. 3B, the expanded tube assembly 324 has pried the lever 322 upwards, thereby breaking the bolt 320 in tension. If a plurality of bolt-lever assemblies are used to attach the first U-channel 314 to the second U-channel 316, the expanded tube assembly 324 breaks all the bolts holding the joint together and allows the joint to be separated.

Figure 3C:
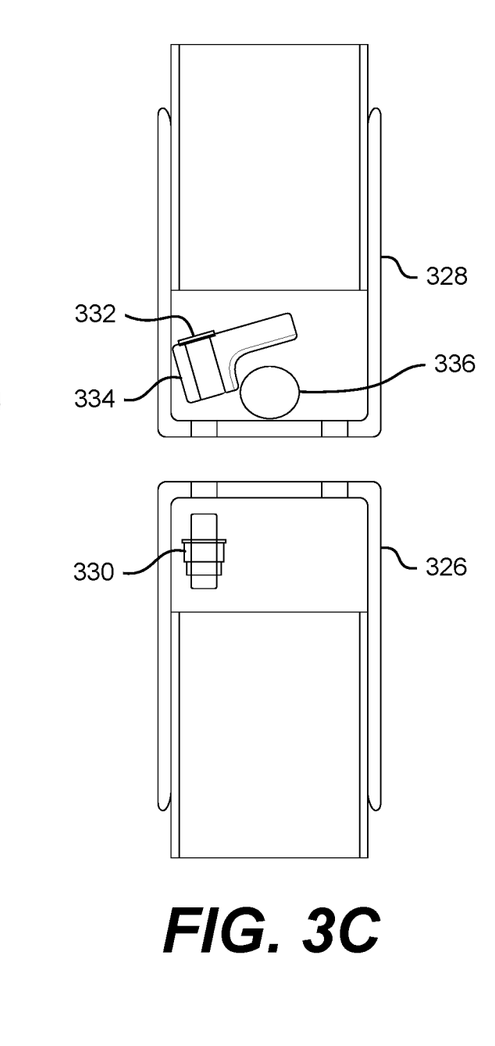
FIG. 3C illustrates an example of an activated separable joint after separation, in accordance with an embodiment.

FIG. 3C illustrates an example of an activated separable joint after separation, in accordance with an embodiment. The separable joint is created by attaching a first U-channel 326 to a second U-channel 328 with a set of bolt-lever assemblies. Each bolt-lever assembly includes a bolt 332, a nut 330, and a lever 334. In an embodiment, the bolt 332 passes through a hole in the lever 334 and is retained by the second U-channel 328. In one example, the nut 330 is threaded onto the end of the bolt, retaining the other end of the bolt in the first U-channel 326. In another example, a first end of the bolt 332 is retained in the first U-channel 326 by a head on the bolt 332, and a second end of the bolt 332 is retained in the second U-channel 328 by threads in the lever 334.

In the example joint shown in FIG. 3C the state of the joint is shown after an expanding tube assembly 336 has been activated and the joint has been separated. In various examples, activation may occur by detonating an energetic material within the expanding tube assembly, hydraulically expanding the expanding tube, or injecting the tube with an expanding gas. The expanded tube assembly 336 is positioned under an arm of the lever 334. As shown in FIG. 3C, the expanded tube assembly 336 has pried the lever 334 upwards, thereby breaking the bolt 320 in tension. If a plurality of bolt-lever assemblies are used to attach the first U-channel 326 to the second U-channel 328, the expanded tube assembly 336 breaks all the bolts holding the joint together and allows the joint to be separated. In some examples, the loose pieces of the bolt-lever assembly are contained within the interior space of the first U-channel 326 and the second U-channel 328 and their associated panels. By containing the loose parts in this space, the loose parts are prevented from interfering with other objects. For example, in a payload fairing application protecting a satellite, the loose pieces are not allowed to escape and damage the satellite or launch vehicle.

Figure 4A:
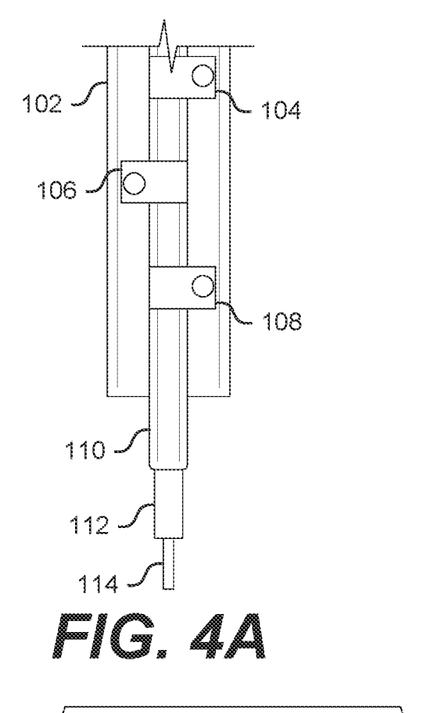
FIG. 4A illustrates an example of a channel assembly of a severable joint, in accordance with an embodiment.

FIG. 4A illustrates an example of a channel assembly of a severable joint, in accordance with an embodiment. The channel assembly includes a U-shaped channel 402 with an alternating pattern of bolt-lever assemblies. The alternating pattern of bolt-lever assemblies includes a first bolt-lever assembly 404, a second bolt-lever assembly 406, and a third bolt-lever assembly 408. Each bolt-lever assembly includes a bolt, a lever, and a retainer (such as a bolt head or nut) that retains a second U-shaped channel to the U-shaped channel 402. An expanding tube assembly 410 runs the length of the U-shaped channel 402. The expanding tube assembly 410 is retained by the levers of the bolt-lever assemblies.

In one example, the expanding tube assembly 410 includes a charge holder 412 and mild detonating cord 414. The expanding tube assembly 410 is activated by detonating the mild detonating cord 414, resulting in expansion of the surrounding tube. As the tube expands, force is exerted on each of the levers. The force is amplified by the levers, causing the bolts to break, thereby releasing the joint and allowing the separation of the two U-shaped channels.

Figure 4B:
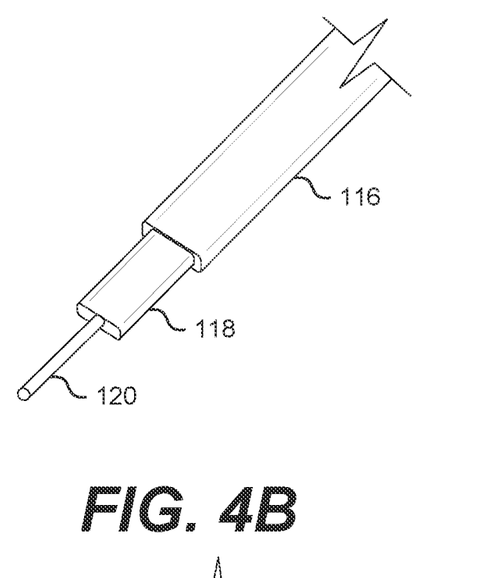
FIG. 4B illustrates an example of an expanding tube assembly in accordance with an embodiment.

FIG. 4B illustrates an example of an expanding tube assembly 416 in accordance with an embodiment. In various examples, expanding tube assemblies, also known as expanding shielded mild detonating cord ("XSMDC"), are used to provide an explosively driven separation. In some examples, the expanding tube assembly 416 is a formed stainless steel tube containing a linear mild detonating cord ("MDC") 420. In an embodiment, the tube is formed into an oval shape and sealed on one or more ends by welded end fittings which may include loaded booster shells. The booster shells provide for redundant initiation of the assembly. After initiation, the MDC propagates and the energy expands the tube, creating a mechanical impulse to achieve, for example, separation of a separable Joint.

In one example, the mild detonating cord 420 is constructed with an active element of hexanitrostilbene ("HNS") at a specified grain loading. The mild detonating cord 420 is held approximately in the center of the tube with a charge holder 418. In one example, all bolt-lever assemblies were broken in a test joint by using an expanding tube constructed of 0.049" wall thickness and a load of 15.5 gr/ft of HNS. The MDC included a silver sheath and was installed into a modified charge holder which was inserted into an un-annealed corrosion resistant steel ("CRES") (such as stainless steel) tube.

Figure 4C:
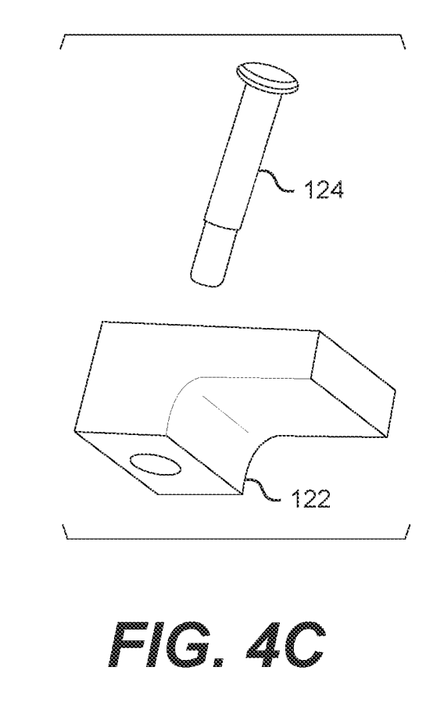
FIG. 4C illustrates an example of lever and bolt used in a severable joint in accordance with an embodiment.

FIG. 4C illustrates an example of lever 422 and bolt 424 used in a severable joint in accordance with an embodiment. In one embodiment, the bolt 424 is an HL 10 Hi LOK, Ti 6-4, notched bolt. In another embodiment, the bolt 424 is a fully threaded NAS fastener. In one embodiment, the bolt 424 is passed through a hole in the lever 422 and is retained by a head on the bolt. The bolt passes through a hole in the first channel and a second channel and is retained by the second channel using a lock nut. In another embodiment, the bolt 424 is retained in the second channel by a head on the bolt 424, and passes through a hole in the first channel and the second channel and is retained by a threaded hole in the lever 422. In some implementations, the threaded hole in the lever 422 is counterbored from the side that contacts the channel. In other implementations, the threaded hole in the lever 422 is not counterbored. By not counterboring the threaded hole in the lever 422, the bolt is encouraged to break at the first thread exposed by the lever. In some examples, the bolt 424 includes a narrowed section or ring that encourages the bolts to break close to the contact point between the first channel and the second channel. In other examples, the bolt 424 does not have a narrowed section, notch, or ring, and the bolt tends to break at the interface of the lever and the U-channel.

Figure 4D:
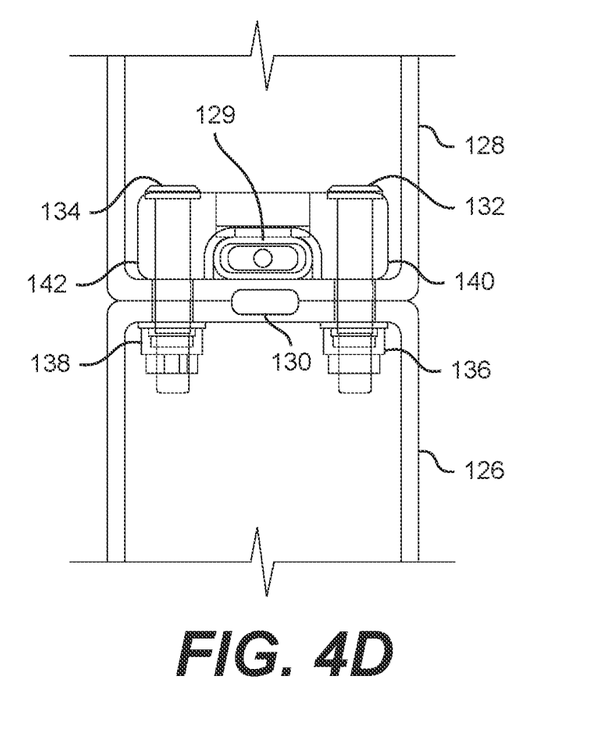
FIG. 4D illustrates an example of a severable joint assembly with a keyway in accordance with an embodiment.

FIG. 4D illustrates an example of a separable joint assembly with a keyway in accordance with an embodiment. In an embodiment, the separable joint is constructed by joining a first channel 426 to a second channel 428 with a set of bolt-lever assemblies separated by an expanding tube assembly 429. The expanding tube assembly 429, in some embodiments, is a stainless steel tube containing mild detonating cord that, when activated, expands the stainless steel tube and exerts a force on each lever of the bolt-lever assemblies to break the bolts holding the joint together.

In some examples, the separable joint includes one or more keyways 430 running lengthwise along the channels. The keyways 430 carry shear loads that may be exerted on the joint. In some implementations, additional keyways are placed periodically across the width of the separable joint. In yet another embodiment, the joint includes periodic dowels that carry shear loads exerted on the joint. In general, the presence of keyways and/or dowels alleviates shear loading on the bolts, and the bolts hold the joint together mainly in tension.

The bolt-lever assemblies may be distributed in alternating fashion on either side of the expanding tube assembly 429. In one embodiment, the set of bolt-lever assemblies includes a first bolt-lever assembly comprised of a first bolt 432, a first lever 440, and a first lock nut 436. The set of bolt-lever assemblies includes a second bolt-lever assembly comprised of a second bolt 434, a second lever 442, and a second lock nut 438. Each bolt-lever assembly can be constructed using various alternative bolt-lever assemblies as described elsewhere in the present document. For example, each bolt-lever assembly can be constructed using a threaded lever, the counterbored threaded hole, a non-counterbored hole, a notched bolt, or other variation described herein. In some implementations, a variety of bolt-lever variations may be used in a single joint.

Figure 5A:
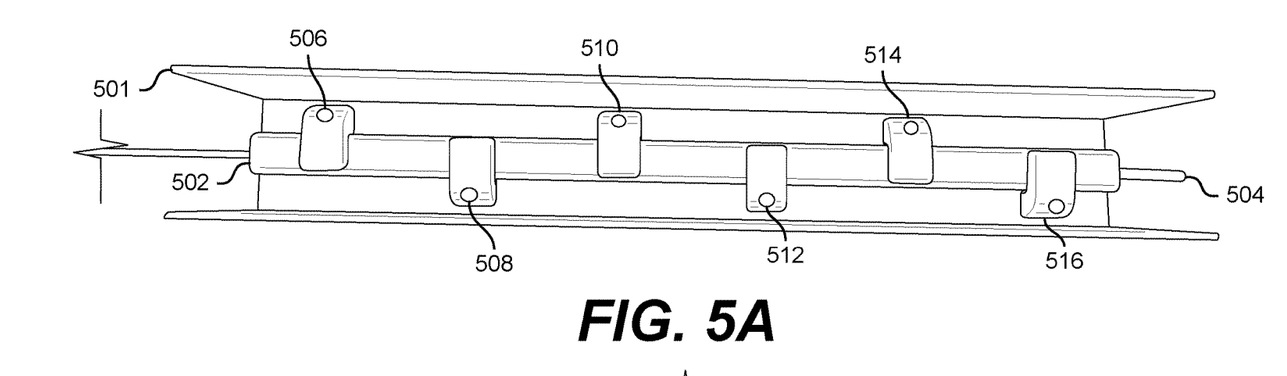
FIG. 5A illustrates an example of a channel of a severable joint with an alternating pattern of levers, in accordance with an embodiment.

FIG. 5A illustrates an example of a channel 501 of a severable joint with an alternating pattern of bolt-lever assemblies, in accordance with an embodiment. In one example, an expanding tube assembly 502 runs the length of the channel and is secured to the bottom of the channel with the alternating pattern of bolt-lever assemblies. The expanding tube assembly 502 includes a section of mild detonating cord 504 that, when activated, expands the tube and exerts a force upwards on each lever of the bolt-lever assemblies. In the example illustrated in FIG. 5A, the separable joint includes six bolt-lever assemblies that include a first bolt-lever assembly 506, a second bolt-lever assembly 508, a third bolt-lever assembly 510, a fourth bolt-lever assembly 512, a fifth bolt-lever assembly 514, and a sixth pulled-lever assembly 516.

Each bolt-lever assembly fastens the channel 501 to an additional channel on the opposite side of the separable joint (not shown). Each bolt-lever assembly includes an L-shaped lever secured with a corresponding bolt such that an arm of the lever extends over and captures the expanding tube assembly 502. Each bolt-lever assembly can be constructed in a variety of ways as described elsewhere in the present document. In some examples, each bolt-lever assembly is assembled by threading a bolt into a threaded hole through the lever.

When the mild detonating cord 504 is activated, a force is exerted on each arm of each lever, and each bolt is broken in tension allowing the joint to separate. In some embodiments, the mild detonating cord 504 is activated from both ends of the expanding tube assembly 502. This allows for redundant ignition of the mild detonating cord 504, and also allows for successful activation of the expanding tube assembly 502 even when there is a single break in the mild detonating cord 504 that prevents propagation of the detonation. In some embodiments, a long separable joint may be broken into a plurality of joint sections, each section broken by a separate section of expanding tube assembly, and each section of expanding tube assembly being ignited from both ends. In such embodiments, two ends of two different sections of expanding tube assembly may be activated from a single igniter. In yet another embodiment, multiple expanding tube assemblies may run the length of a separable joint section such that more than one expanding tube assembly passes under each lever.

Figure 5B:
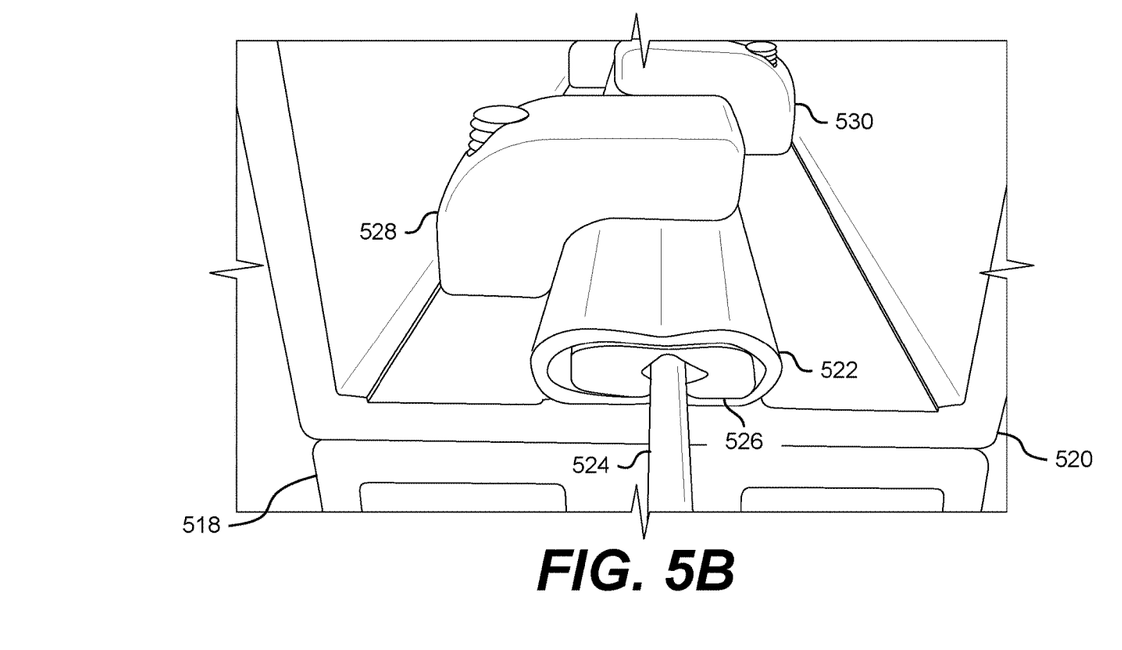
FIG. 5B illustrates an example of a channel of a severable joint with a flattened expanding tube, in accordance with an embodiment.

FIG. 5B illustrates an example of a separable joint with a flattened expanding tube, in accordance with an embodiment. The separable joint is constructed from two U-shaped channels; a first channel 518, and a second channel 520. In some examples, the channels include complementary elements that carry shear loads across the joint. For example, some embodiments include a groove running the length of the first channel 518 and a complementary ridge running the length of the second channel 520. In another example, matching grooves are present in both the first channel 518 and the second channel 520 and a key is placed in the grooves to carry shear loads. In yet another example, dowels are interspersed along the length and/or width of the joint.

The channels are secured together with a set of bolts arranged in an alternating pattern 15 along the length of the joint. In one example, one end of each bolt is retained in the first channel 518 using a head or nut, and the other end of each bolt is retained in the second channel 520 by a lever. The lever includes a threaded hole into which the bolt is threaded. In some embodiments, the bottom of the hole in the lever is counterbored. In other embodiments, the bottom of the hole in the lever is not counterbored. In some examples, a notch or groove is added to each bolt to encourage breakage in a particular location.

In one example, an expanding tube assembly 522 is placed in the bottom of the second channel 520. The expanding tube assembly 522 includes a length of mild detonating cord 524 that is held approximately in the center of the expanding tube assembly 522 with a charge holder 526.

In an embodiment, the channels are retained with a plurality of bolt-lever assemblies. In some examples, the bolt-lever assemblies produce an alternating pattern along the length of the channel. A first bolt-lever assembly 528 secures a first bolt to the second channel 520 and an arm of the first bolt-lever assembly 528 extends over the expanding tube assembly 522. A second bolt-lever assembly 530 secures a second bolt to the second channel 520 and an arm of the second bolt-lever assembly 530 extends over the expanding tube assembly 522. Additional bolt-lever assemblies may be present along the length of the joint.

In various experiments, bolt breakage has been successful using non-counterbored holes in the levers, where the bolts to not contain a notch or groove. In various tests using NAS1351-3-12P, 3/16" bolts, the following results were obtained. The average break force was 1205lb, with a standard deviation of 52.9lb. The average actuation to break the bolt was 0.12" with a standard deviation of 0.008" (tube act.=~0.2" static deflect). The non-counterbored threaded hole in the lever produced a very consistent clean break regardless of torque variation. The use of counterbored holes produced undesirable break patterns in the bolts, and required approximately 1.5 times more energy than the non-counterbored configuration. In addition, the use of the counterbored hole tends to bend the bolt shank before breaking, creating a potential hang up of the joint release. The non-counterbored design allows for proper function over a wide range of bolt torque. In various examples, the dimensions of the lever are adjusted to increase or decrease the contact area between the lever and the expanding tube assembly. Increasing the area increases the force on the lever, producing a greater breaking force, and decreasing the area reduces the breaking force.

Figure 6:
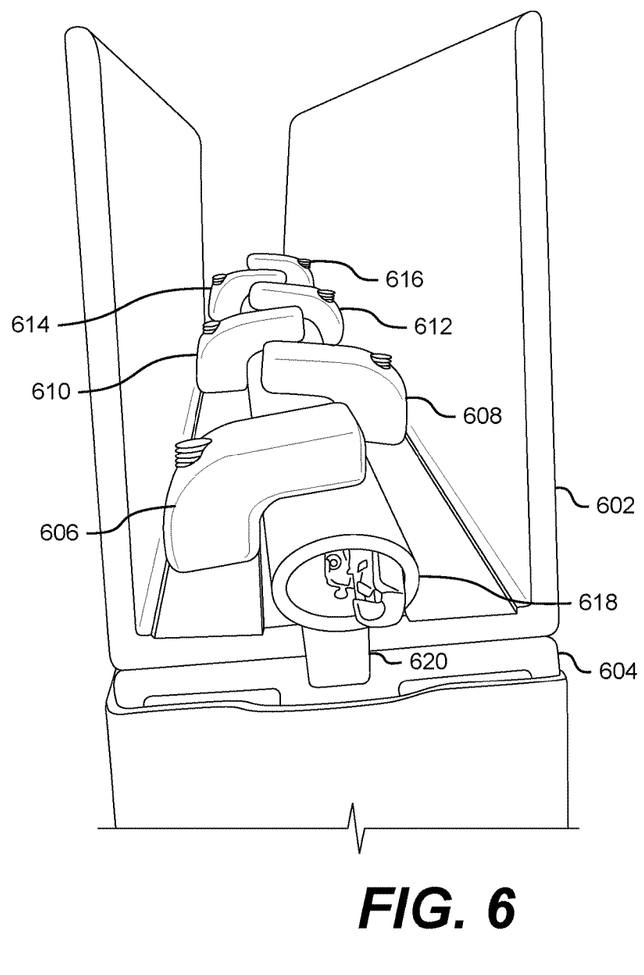
FIG. 6 illustrates an example of an activated separable joint, in accordance with an embodiment.

FIG. 6 illustrates an example of an activated separable joint, in accordance with an embodiment. In an embodiment, the separable joint includes a first U-shaped channel 602 joined to a second U-shaped channel 604 using a set of bolts positioned in an alternating pattern along the length of the separable joint. The separable joint includes a first bolt-lever assembly 606, a second bolt-lever assembly 608, a third bolt-lever assembly 610, a fourth bolt-lever assembly 612, a fifth bolt-lever assembly 614, and a sixth bolt-lever assembly 616. Each bolt is retained on one side using a corresponding lever with a threaded hole. Each lever includes an arm that extends over the expanding tube assembly. In the example illustrated in FIG. 6, the expanding tube assembly 618 has been activated, causing the expanding tube assembly 618 to take on an oval or rounded shape. The resulting force on the levers has caused the levers to be pried upward, imparting a force on each of the bolts causing each bolt to break. Once the bolts are broken, the first U-shaped channel 602 and second U-shaped channel 604 are free to separate.

In various embodiments, the separable joint includes one or more keys or complementary features that carry shear load across the joint. In one embodiment, a keyway 620 is provided in the first U-shaped channel and second U-shaped channel, and a key is positioned in the keyway 620 to carry shear loads across the joint.

Figure 7:
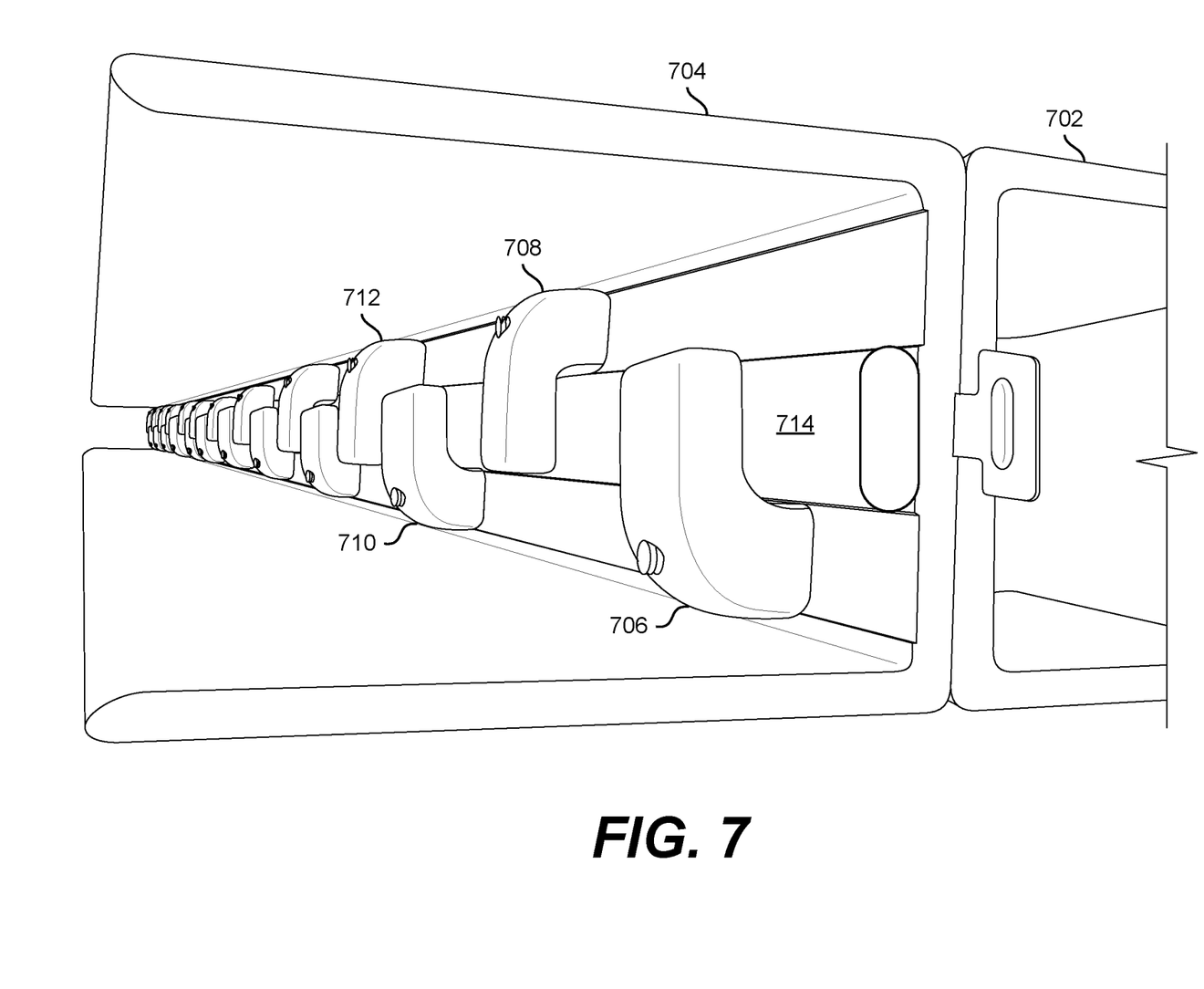
FIG. 7 illustrates an example of a separable joint, in accordance with an embodiment.

FIG. 7 illustrates an example of a separable joint, in accordance with an embodiment. The separable joint is constructed using a first U-channel 702 that is connected to a second U-channel 704 with a series of bolt-lever assemblies arranged in an alternating pattern across the width and along the length of the joint. The joint includes a first bolt-lever assembly 706, a second bolt-lever assembly 708, a third bolt-lever assembly 710, and a fourth bolt-lever assembly 712. Each bolt-lever assembly includes a bolt inserted through the base of the first U-channel 702 and second U-channel 704 and into a threaded hole in a lever. In various embodiments, the bolt is retained in the first U-channel with either a nut, lock nut, or bolt head. Each lever includes an arm that extends over the center of the joint.

In various embodiments, an expanding tube assembly 714 is positioned along the center of the joint underneath the arms of each lever such that when the expanding tube assembly 714 is activated, each lever is pried upwards breaking a corresponding bolt. In some examples, the joint may include a plurality of expanding tube assemblies that pass under each lever, or a plurality of expanding tube assemblies, each of which runs along a lengthwise section of the joint.

In various embodiments, the U-channels are connected to portions of a payload fairing, launch vehicle, or component in a manner that seals off the open end of each U-channel. When the expanding tube is activated and the bolts are broken, parts of bolts and loose levers are free to float within the interior space defined by the U-channel and the associated panel. The expanding tube assembly does not, in general, breach the interior space defined by the U-channel. Therefore, due to the size of each lever and broken bolt pieces, the resulting debris is likely trapped within the interior space defined by the U-channel. This helps to prevent contamination of any payload or structure located near the separable joint.

Figure 8:
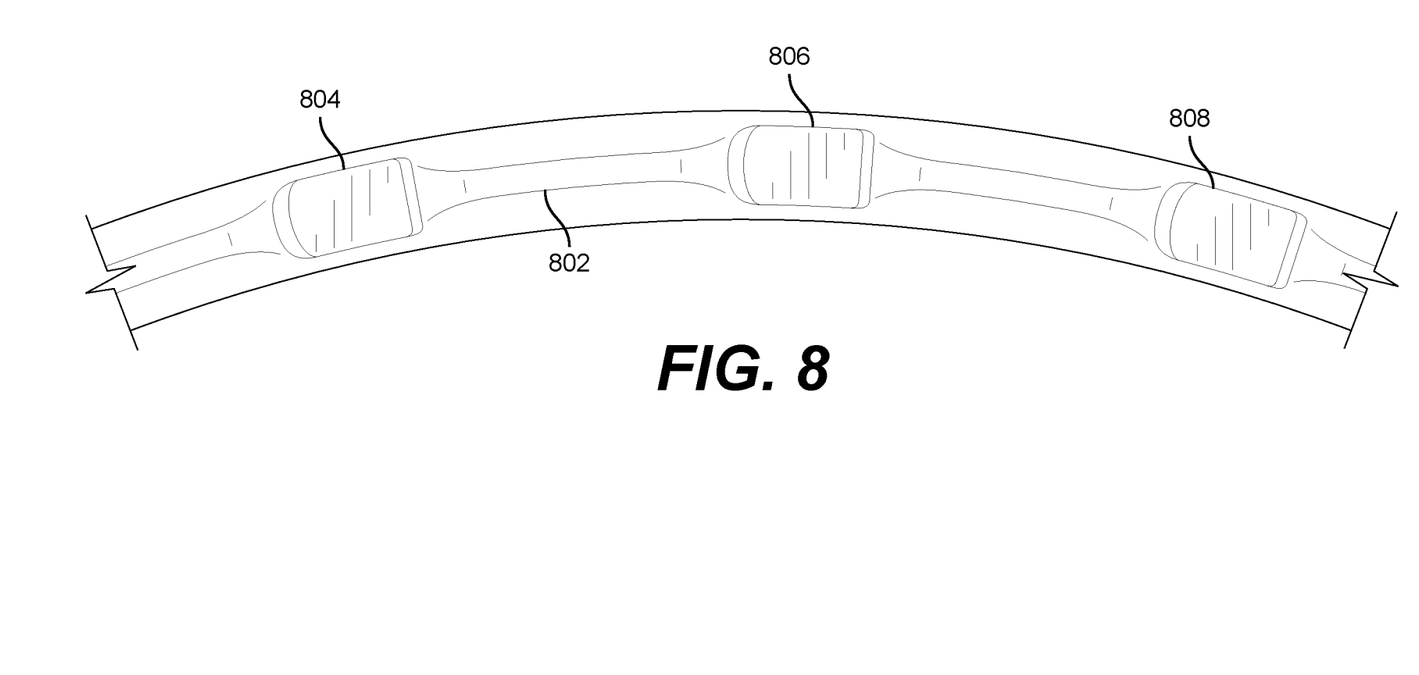
FIG. 8 illustrates an example of a curved expanding tube with flattened portions, in accordance with an embodiment.

FIG. 8 illustrates an example of a curved expanding tube with flattened portions, in accordance with an embodiment. In an embodiment, in its installed state, an expanding tube 802 is generally circular in cross-section but includes flattened portions along the length of the expanding tube 802 to accommodate levers that hold the expanding tube 802 in place. In the example shown, the expanding tube 802 includes a first flattened portion 804, a second flattened portion 806, and a third flattened portion 808.

In some examples, construction of the joint involves obtaining an expanded tube assembly where the expanded tube assembly has a circular cross-section along its entire length. The joint is constructed by forming the expanded tube assembly along the curve or shape of the joint while the expanded tube assembly has a circular cross-section. After the expanded tube assembly conforms generally to the contours of the joint, portions of the expanded tube assembly are flattened to accommodate the placement of levers at each flattened portion. Flattening may occur prior to placing the expanded tube assembly into the joint. By constructing the expanded tube assembly in this way, the tube can be more easily formed to match the contour of the joint.

Figure 9A:
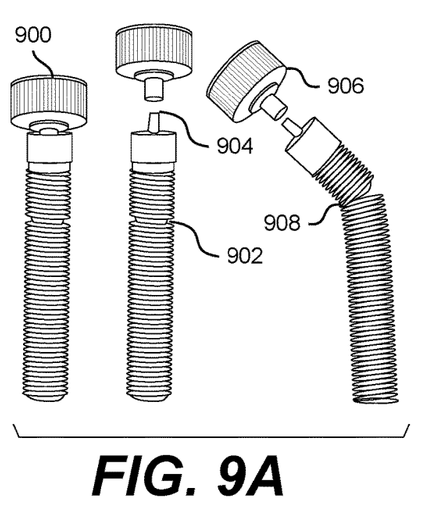
FIG. 9A illustrates an example of a bolt with break point feature, in accordance with an embodiment.

FIG. 9A illustrates an example of a bolt 900 with break point feature, in accordance with an embodiment. In an embodiment, the bolt 900 includes a groove 902 around the circumference of the bolt shaft. When stressed in tension and or bending, the bolt 900 is encouraged to break point 908 at the location of the groove. In some examples, a bolt head 906 is attached with a narrow stein that allows the head to fracture 904. The bolt may be made of various materials including aluminum, steel, stainless steel, brass, nylon, or polymer.

Figure 9B:
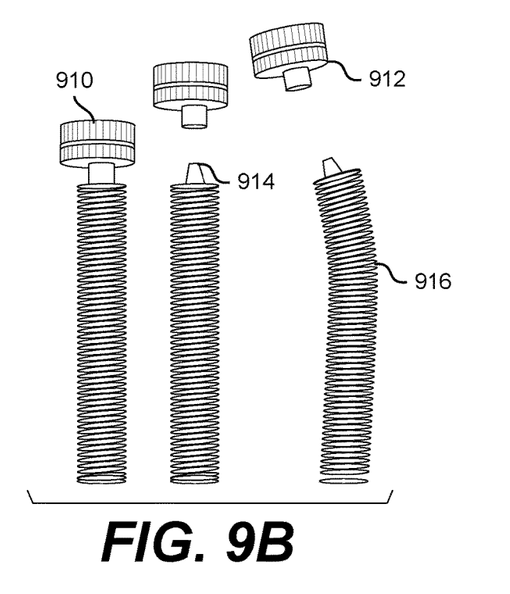
FIG. 9B illustrates an example of a bolt with break point feature, in accordance with an embodiment.

FIG. 9B illustrates an example of a bolt 910 with break point feature, in accordance with an embodiment. In some examples, a bolt head 912 is attached with a narrow stein that allows the head to fracture 914. The bolt may be made of various materials including aluminum, steel, stainless steel, brass, nylon, or polymer. In testing various bolt configurations, the presence of a counterbored hole in the lever tended to produce bolts with a bend 916 rather than a clear break. Such a bend has the potential to cause a hang-up upon separation of the joint, and therefore the use of non-counterbored holes is preferred.

Figure 9C:
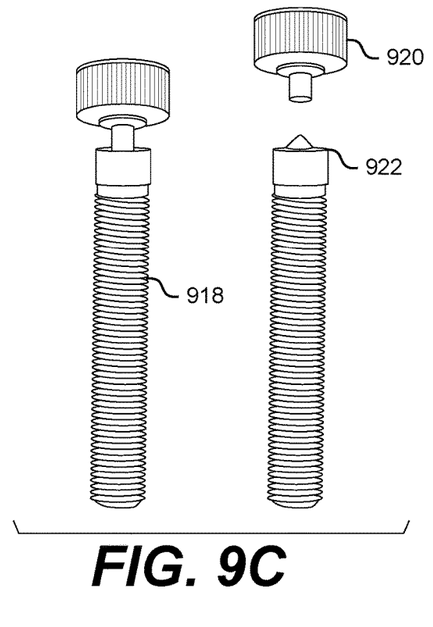
FIG. 9C illustrates an example of a bolt with break point feature, in accordance with an embodiment.

FIG. 9C illustrates an example of a bolt 918 with break point feature, in accordance with an embodiment. In some examples, a bolt head 920 is attached with a narrow stem that allows the head to fracture 922. The bolt may be made of various materials including aluminum, steel, stainless steel, brass, nylon, or polymer.

Figure 9D:
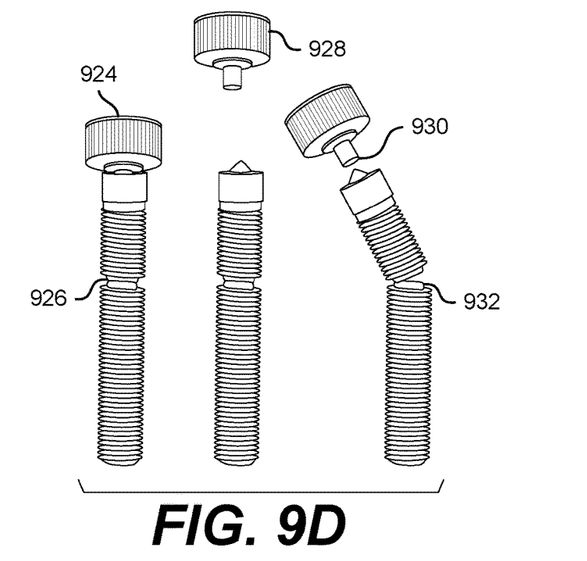
FIG. 9D illustrates an example of a bolt with break point feature, in accordance with an embodiment.

FIG. 9D illustrates an example of a bolt 924 with break point feature, in accordance with an embodiment. In an embodiment, the bolt 924 includes a groove 926 around the circumference of the bolt shaft. When stressed in tension, the bolt 924 is encouraged to break point 932 at the location of the groove. In some examples, a bolt head 928 is attached with a narrow stem that allows the head to fracture 930. The bolt may be made of various materials including aluminum, steel, stainless steel, brass, nylon, or polymer.

The various bolt designs illustrated in FIGS. 9A, 9B, 9C, and 9D may be constructed of various materials such as aluminum, steel, corrosion resistant steel, stainless steel, hardened steel, brass, or nickel. In various bolt breaking tests using aluminum socket head cap screws ("SHCS"): Torque=20 in-lb, preload 420 lb, drop height=36", fractured. Significant excess energy was apparent. In tests with bolts constructed from NA S 1351: Torque=30 in-lb, preload ~ 790 lb, drop height=24", fractured. In tests using bolts with Kerr steel: Torque=30 in-lb, drop height=20", fractured, bending partial fracture at threads. Minimal excess drop energy was apparent.

Figure 10A:
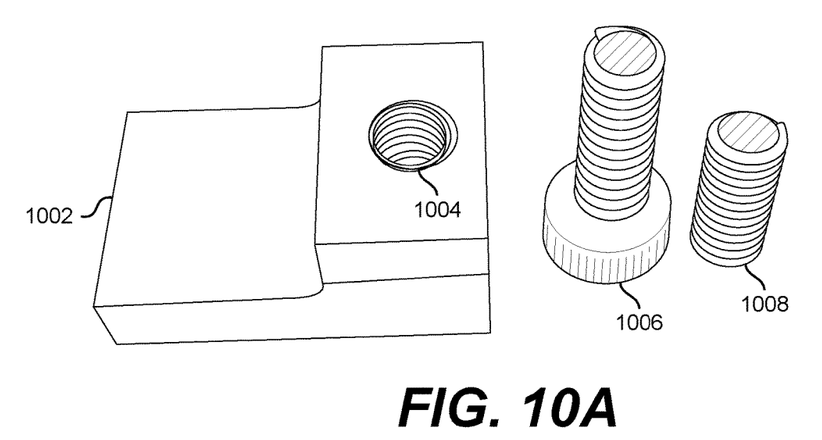
FIG. 10A illustrates an example of a lever with a non-counterbored threaded hole, in accordance with an embodiment.

FIG. 10A illustrates an example of a lever 1002 with a non-counterbored threaded hole 1004, in accordance with an embodiment. In various examples, use of the lever 1002 with the non-counterbored threaded hole 1004 will often cause the bolt to break as illustrated if FIG. 10A producing a first part 1006 and a second part 1008. In various tests, the bolt broke at the first thread not engaged in the threaded hole 1004. In contrast, various test indicate that using a counterbored hole may produce a bending artifact on the bolt fragments.

Figure 10B:
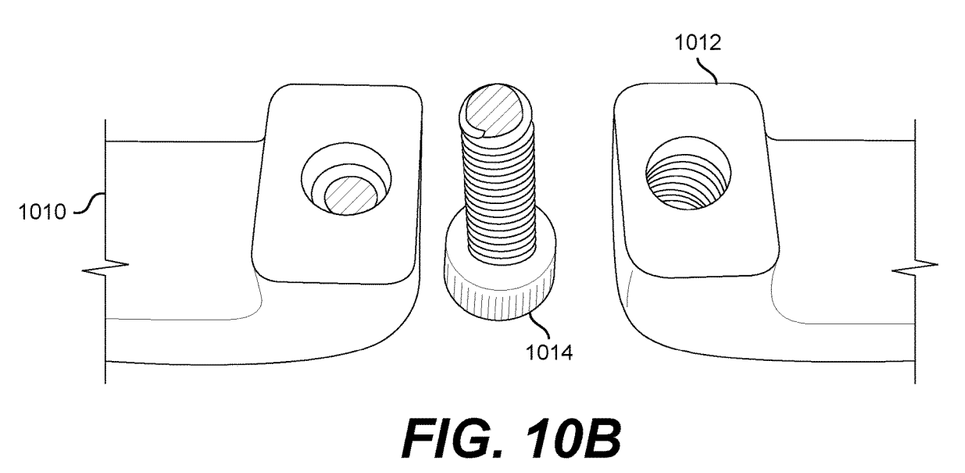
FIG. 10B illustrates an example of a lever with a counterbored threaded hole, in accordance with an embodiment.

FIG. 10B illustrates an example of a lever with a counterbored threaded hole in accordance with an embodiment. In one example, a first lever 1010 includes a counterbored hole that allows a threaded portion of the bolt 1014 to slide freely a portion of the way through the lever before engaging the threads. In another example, a second lever 1012 illustrates a shorter counterbored hole. Such counterbored holes may make assembly easier by assisting with the alignment of the bolt with the threads of the lever. However, the use of counterbored holes in the levers may cause issues when breaking the bolts. Some experiments have indicated that the bolts tended to bend before breaking, leaving a slightly hooked bolt part that has the potential to snag or catch when the joint is released. The risk of these problems may be reduced by increasing the size of the holes in the U-channels so that the joint is more easily separated.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents cited are hereby incorporated by reference to the same extent as if each reference were individually and specifically indicated to be incorporated by reference and were set forth in its entirety.

What is claimed is:

1. A payload fairing comprising:
a plurality of fairing sections, at least two fairing sections attached to each other with a separable joint, the separable joint comprising:
a plurality of bolts including a bolt that holds the separable joint together, the bolt having a first end retained by a first side of the separable joint;
a lever that retains a second end of the bolt to a second side of the separable joint;
a first channel joined to a second channel by the plurality of bolts, each bolt of the plurality of bolts retained by the first channel with an individual lever of a plurality of levers; and
an expanding tube assembly arranged to exert a force on an arm of the lever, the force capable of causing the bolt to be broken and allowing the at least two fairing sections to be separated, the plurality of levers retaining the expanding tube assembly.

2. The payload fairing of claim 1, wherein:
the separable joint includes a first U-shaped channel attached to a second U-shaped channel with the bolt;
the lever and the expanding tube assembly are contained within the second U-shaped channel; and
the first end of the bolt is retained in the first U-shaped channel.

3. The payload fairing of claim 2, wherein:
the bolt is one of a set of bolts that attach the first U-shaped channel to the second U-shaped channel; and
breaking each bolt in the set of bolts allows the first U-shaped channel to be separated from the second U-shaped channel.

4. The payload fairing of claim 1, wherein separating the separable joint allows the payload fairing to be detached from a launch vehicle.

5. The payload fairing of claim 1, wherein:
the separable joint includes a plurality of bolts;
each bolt of the plurality of bolts is retained by a corresponding lever of a plurality of levers; and
the plurality of bolts is capable of being broken as a result of activating the expanding tube assembly.

6. A joint assembly, comprising:
a bolt having a first end and a second end, the first end to be retained by a first structure;
a lever to retain the second end of the bolt to a second structure; and
an expanding tube assembly capable of exerting a force on an arm of the lever to cause the bolt to be broken to stop the bolt from preventing separation of the first structure from the second structure, wherein:
the bolt is one of a plurality of bolts;
the joint assembly further comprises a first channel joined to a second channel by the plurality of bolts each bolt of the plurality of bolts retained by the first channel with an individual lever of a plurality of levers;

the expanding tube assembly is positioned along a length of the first channel;

the plurality of bolts are positioned on alternating sides of the expanding tube assembly; and the plurality of levers retain the expanding tube.

7. The joint assembly of claim 6, wherein:

the bolt holds the joint assembly together primarily in tension; and the joint assembly includes a keyway that carries shear loads of the separable joint.

8. The joint assembly of claim 6, wherein:

the bolt is retained by a threaded hole in the lever; and the expanding tube is retained by the arm of the lever.

9. The joint assembly of claim 6, wherein the expanding tube includes flattened portions that are retained by the plurality of levers.

10. The joint assembly of claim 6, wherein the first channel and the second channel are substantially enclosed to retain pieces of the joint assembly after the bolts are broken.

11. The joint assembly of claim 6, wherein:

the bolt is a rivet, cap head screw, a hex-head bolt, a pin, a screw, or a section of all-thread; and a shaft of the bolt includes a narrowed section that is intended to break if the expanding tube is activated.

12. The joint assembly of claim 6, wherein:

the bolt is retained by a threaded hole in the lever; and threads of the threaded hole are not counterbored.

13. A method of separating a joint comprising:

detonating an energetic material inside an expanding tube assembly, the expanding tube assembly retained by a lever;

breaking a set of bolts as a result of a force exerted on the lever; and releasing the joint as a result of breaking the set of bolts, the joint comprising a first channel joined to a second channel by the set of bolts with at least a first bolt of the plurality of bolts retained by the first channel with the lever.

14. The method of separating the joint of claim 13, further comprising separating the joint.

15. The method of separating the joint of claim 13, wherein:

the bolt is in the set of bolts that hold the joint together; and each bolt in the set of bolts is broken to release the joint.

16. The method of separating the joint of claim 13, wherein:

the force is exerted by detonating the energetic material within the expanding tube assembly; and the energetic material is made from detonating cord.

17. The method of separating the joint of claim 13, wherein:

the first channel and the second channel include a keyway; and a key is located in the keyway to carry shear loads across the joint.

18. The method of separating the joint of claim 13, wherein the bolt is broken in shear by a force transmitted by the lever.

\* \* \* \* \*